R. J. RUBLE.
MILK PAIL HOLDER.
APPLICATION FILED MAR. 28, 1910.
975,288.
Patented Nov. 8, 1910.
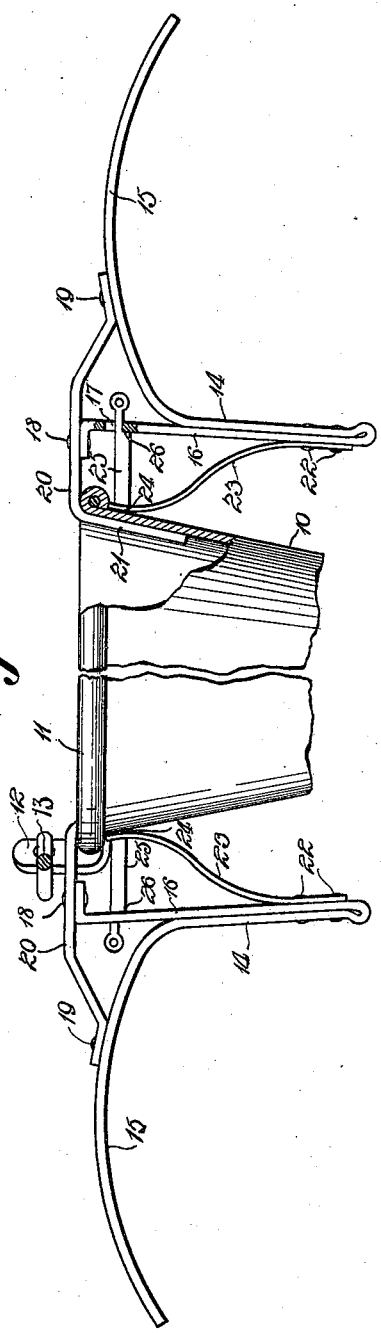
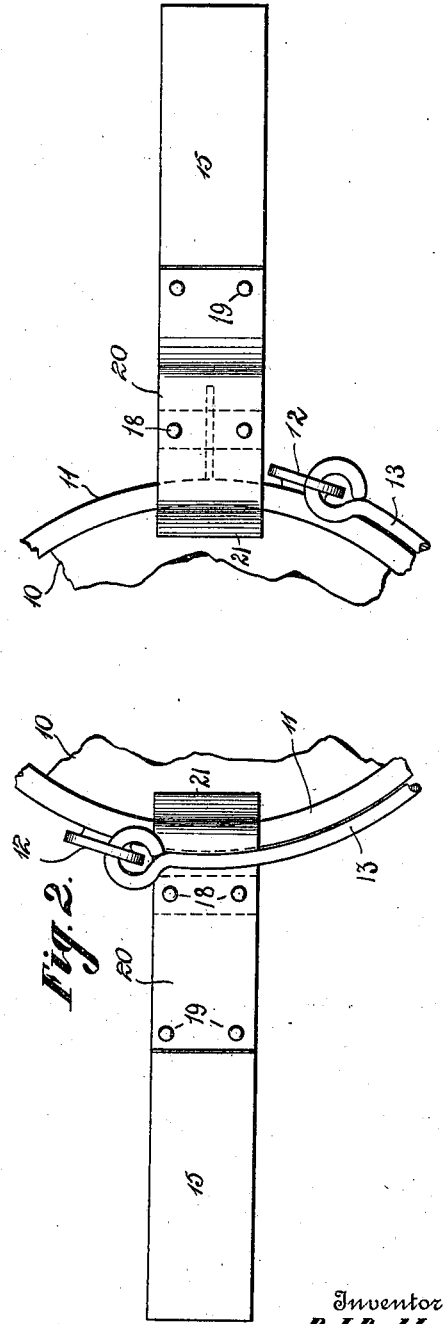
Witnesses
C. C. Chandlee
C. N. Woodward
Inventor
R. J. Ruble.
By Chandlee & Chandlee
Attorneys

UNITED STATES PATENT OFFICE.

ROLLO J. RUBLE, OF FAIRMONT, MINNESOTA.

MILK-PAIL HOLDER.

975,288.  Specification of Letters Patent.  Patented Nov. 8, 1910.

Application filed March 28, 1910. Serial No. 551,883.

*To all whom it may concern:*

Be it known that I, ROLLO J. RUBLE, a citizen of the United States, residing at Fairmont, in the county of Martin, State of Minnesota, have invented certain new and useful Improvements in Milk-Pail Holders; and I do hereby declare the following to be a full, clear, and exact description of the invention, such as will enable others skilled in the art to which it appertains to make and use the same.

This invention relates to attachments for milk pails for holding the same during the milking operation, and has for one of its objects to provide a simply constructed device of improved construction and increased efficiency and utility and which may be readily attached to and detached from the pail.

With this and other objects in view, the invention consists in certain novel features of construction as hereinafter shown and described and then specifically pointed out in the claims; and, in the drawings illustrative of the preferred embodiment of the invention, Figure 1 is a side elevation, partly in section, of a portion of a conventional milk pail with the improved device attached, Fig. 2 is a plan view of the parts shown in Fig. 1.

The improved device may be applied to milk pails of various sizes, but is designed more particularly for application to the ordinary milk pail having an outwardly directed rolled rim at the upper edge, and for the purpose of illustration is shown applied to a conventional pail of this character, the body of the pail being represented at 10 and the rolled over rim at 11, of the usual construction.

The usual bail ears are represented at 12 and the bail at 13, and two of the improved devices are employed with each pail and preferably attached to the rolled over rim adjacent to the bail ears, as shown. In order to support the pail uniformly the attachments are applied at opposite sides of the ears, and preferably close thereto, as shown. By this means the attachments are located at exactly opposite points upon the pail.

As above stated two of the improved devices will be employed, but as they are precisely alike the description of one will suffice for both.

The improved device comprises a vertical portion 14 with an outwardly directed curved portion 15 to bear over the knees of the operator. The member 14 is provided with an upwardly directed portion 16 having a vertical slot 17, and connected at 18—19 to the portions 15—16 is a horizontal member 20, the member thus forming a brace between the members 15—16, and extended inwardly from the portion 16 and thence downwardly as shown at 21. The portion 21 is spaced from the portion 16, and is designed to bear over the rim 11 and into the interior of the body 10, as shown in Fig. 1. Secured by rivets or other suitable fastening means 22 to the standard 14 is a resilient locking member 23 with its upper end adapted to bear beneath the rolled over rim 11 of the pail, as shown in Fig. 1. Connected at 24 to the member 23 is a holding bar 25 passing through the slot 17 and provided with a suitable shoulder 26 adapted to engage against the inner face of the member 16 and thus hold the resilient member 23 in its outward position and in engagement with the pail 10. By this means when the bar 25 is in its outward or locked position, as shown in Fig. 1, the member 25 will be correspondingly locked in position beneath the rolled over rim 11, and thus lock the device firmly to the pail. By this arrangement it will be obvious that when two of these devices are attached to the pail at opposite sides efficient supporting devices are provided which enable the operator to support the pail in convenient position between the knees, and without the necessity for exercising any pressure against the pail by the knees. Thus the labor incident to the milking operation is materially reduced, while at the same time all danger of the displacement of the pail is avoided.

The improved device is simple in construction, can be inexpensively manufactured and applied without material structural changes to pails of various sizes and forms. When it is desired to release the device from the pail it is only necessary to elevate the outer ends of the bars 25 to raise the shoulders 26 above the bottom ends of the slots 17, when the resiliency of the members 23 will force the bars 25 through the slots and thus detach the resilient bars from engagement with the rim 11 and permit the ready removal of the device.

The improved device is shown constructed from strips of plate metal and secured by suitable rivets, but it will be understood that it is not desired to limit the device to the precise construction shown, as the body of the device may be constructed of cast or malleable iron or the like, without departing from the principle of the invention or sacrificing any of its advantages.

What is claimed is:—

1. A pail holder comprising a vertical body having a knee engaging portion projecting therefrom at one side and a pail rim engaging portion projecting therefrom at the other side, a resilient member connected at one end to said body and operating between the body and the rim engaging portion thereof, said resilient member being adapted for bearing when extended beneath the rim of a pail, and means for releasing said resilient member.

2. A pail holder comprising a vertical body having a vertical slot and with a knee engaging portion projecting therefrom at one side and a pail rim engaging portion projecting therefrom at the other side, a resilient member connected at one end to said body and adapted to bear when extended beneath the rim of a pail, and a holding bar connected to said resilient member and slidable through said slot and provided with a stop shoulder to limit its movement in one direction.

In testimony whereof, I affix my signature, in presence of two witnesses.

ROLLO J. RUBLE.

Witnesses:
Wm. Doyle,
C. E. Doyle.